US00RE49000E

(19) United States
(12) Reissued Patent
Yang

(10) Patent Number: US RE49,000 E
(45) Date of Reissued Patent: Mar. 29, 2022

(54) TEN-FREQUENCY BAND ANTENNA

(71) Applicant: TAOGLAS GROUP HOLDINGS LIMITED, Enniscorthy (IE)

(72) Inventor: Tsai Yi Yang, Tainan (TW)

(73) Assignee: TAOGLAS GROUP HOLDINGS LIMITED, Enniscorthy (IE)

(21) Appl. No.: 16/141,512

(22) Filed: Sep. 25, 2018

Related U.S. Patent Documents

Reissue of:
(64) Patent No.: 9,755,310
Issued: Sep. 5, 2017
Appl. No.: 14/948,226
Filed: Nov. 20, 2015

(51) Int. Cl.
*H01Q 1/38* (2006.01)
*H01Q 9/04* (2006.01)
*H01Q 5/371* (2015.01)
*H01Q 1/24* (2006.01)

(52) U.S. Cl.
CPC ..... *H01Q 9/04* (2013.01); *H01Q 1/243* (2013.01); *H01Q 1/38* (2013.01); *H01Q 5/371* (2015.01)

(58) Field of Classification Search
None
See application file for complete search history.

(56) References Cited

U.S. PATENT DOCUMENTS 6,198,442 B1 3/2001 Rutkowski et al.
6,281,848 B1 8/2001 Nagumo et al.
6,323,811 B1 11/2001 Tsubaki et al.
6,380,895 B1 4/2002 Moren et al.
6,596,634 B2 7/2003 Umetsu et al.
6,657,593 B2 12/2003 Nagumo et al.
6,693,604 B2 2/2004 Washiro et al.
6,740,582 B2 5/2004 Siniaguine
6,812,549 B2 11/2004 Umetsu et al.
7,115,972 B2 10/2006 Dotta et al.
(Continued)

FOREIGN PATENT DOCUMENTS

CA 2887126 A1 4/2014
CN 1485950 A 3/2004
(Continued)

OTHER PUBLICATIONS

Search Report dated Feb. 1, 2017 of the corresponding European patent application.

*Primary Examiner* — Roland G Foster
(74) *Attorney, Agent, or Firm* — Garson & Gutierrez, PC

(57) ABSTRACT

A ten-frequency band antenna includes a carrier, a high-frequency segment, a low-frequency segment, a printed circuit board (PCB) and an inductor. The high-frequency segment is arranged on left side of the carrier and the low-frequency segment is arranged on right side of the carrier. The radiator on the bottom face of the carrier electrically connects with the micro strip of the PCB and the ground line of the ground metal when the carrier is fixed to the PCB. The low-frequency segment is located at an opened area and corresponding to a metal face with smaller area such that the low-frequency segment is at a free space to enhance the frequency response of the low-frequency segment and the bandwidth of the high-frequency segment. The area and the volume of blind hole on the carrier can adjust the effective dielectric constant to adjust the resonant frequency and bandwidth of the antenna.

14 Claims, 9 Drawing Sheets

(56) References Cited

U.S. PATENT DOCUMENTS

| | | | | |
|---|---|---|---|---|
| 7,183,980 | B2 | 2/2007 | Chang et al. | |
| 7,276,780 | B2 | 10/2007 | Dotta et al. | |
| D555,154 | S | 11/2007 | Lin et al. | |
| 7,345,650 | B2 | 3/2008 | Bae et al. | |
| D592,195 | S | 5/2009 | Wu et al. | |
| 7,557,759 | B2 | 7/2009 | Lin et al. | |
| 7,705,792 | B2 | 4/2010 | Qi et al. | |
| 7,728,776 | B2 | 6/2010 | Lin et al. | |
| 7,952,529 | B2 | 5/2011 | Huang et al. | |
| 8,216,934 | B2 | 7/2012 | Yoshida et al. | |
| 8,373,599 | B2 * | 2/2013 | Lin | H01Q 1/243 343/700 MS |
| 8,779,988 | B2 * | 7/2014 | Yang | H01Q 1/243 343/700 MS |
| 8,970,436 | B2 * | 3/2015 | Yang | H01Q 1/243 343/700 MS |
| 9,325,066 | B2 | 4/2016 | Wong et al. | |
| D765,062 | S | 8/2016 | Zheng et al. | |
| D768,116 | S | 10/2016 | Zheng et al. | |
| 9,461,359 | B2 * | 10/2016 | Kanj | H01Q 1/243 |
| 9,502,757 | B2 | 11/2016 | Zuniga | |
| D778,882 | S | 2/2017 | Zheng et al. | |
| D778,883 | S | 2/2017 | Zheng et al. | |
| D792,871 | S | 7/2017 | Zheng | |
| 9,755,310 | B2 | 9/2017 | Quinlan | |
| D799,453 | S | 10/2017 | Chang et al. | |
| 9,912,043 | B1 | 3/2018 | Yang | |
| D815,072 | S | 4/2018 | Chang et al. | |
| D819,610 | S | 6/2018 | Zheng | |
| 10,135,129 | B2 | 11/2018 | Zuniga-Juarez | |
| 2002/0126049 | A1 | 9/2002 | Okabe et al. | |
| 2002/0163470 | A1 | 11/2002 | Nagumo et al. | |
| 2003/0063033 | A1 | 4/2003 | Purr et al. | |
| 2004/0169606 | A1 | 9/2004 | Sato et al. | |
| 2004/0246180 | A1 | 12/2004 | Okado | |
| 2005/0073462 | A1 | 4/2005 | Lin et al. | |
| 2006/0131691 | A1 | 6/2006 | Roozeboom et al. | |
| 2007/0205948 | A1 | 9/2007 | Lee et al. | |
| 2007/0236394 | A1 | 10/2007 | Aoyama et al. | |
| 2008/0238803 | A1 | 10/2008 | Yang et al. | |
| 2009/0128416 | A1 | 5/2009 | Cheng | |
| 2009/0146905 | A1 | 6/2009 | Morita | |
| 2009/0243937 | A1 | 10/2009 | Humphrey et al. | |
| 2010/0301485 | A1 | 12/2010 | Sekine et al. | |
| 2011/0043432 | A1 | 2/2011 | Ineichen et al. | |
| 2011/0193226 | A1 | 8/2011 | Kirby et al. | |
| 2012/0092220 | A1 | 4/2012 | Tani et al. | |
| 2012/0127056 | A1 | 5/2012 | Park et al. | |
| 2012/0169555 | A1 * | 7/2012 | Tsou | H01Q 5/364 343/749 |
| 2012/0182186 | A1 | 7/2012 | Yang et al. | |
| 2013/0257671 | A1 | 10/2013 | Chen et al. | |
| 2014/0085161 | A1 | 3/2014 | Zhu et al. | |
| 2014/0266972 | A1 | 9/2014 | Yang | |
| 2014/0354482 | A1 | 12/2014 | Yang et al. | |
| 2014/0375507 | A1 | 12/2014 | Lin et al. | |
| 2015/0002359 | A1 | 1/2015 | Dong et al. | |
| 2015/0288059 | A1 | 10/2015 | Zuniga | |
| 2017/0047651 | A1 | 2/2017 | Zuniga | |
| 2017/0149136 | A1 | 5/2017 | Quinlan | |
| 2017/0170566 | A1 | 6/2017 | Wu et al. | |
| 2017/0288311 | A1 | 10/2017 | Zhong et al. | |
| 2018/0233814 | A1 | 8/2018 | Zuniga-Juarez | |
| 2018/0342808 | A1 | 11/2018 | Quinlan et al. | |
| 2019/0067816 | A1 | 2/2019 | Quinlan et al. | |

FOREIGN PATENT DOCUMENTS

| | | | |
|---|---|---|---|
| CN | 1518783 | A | 8/2004 |
| CN | 101308950 | A | 11/2008 |
| CN | 201440454 | U | 4/2010 |
| CN | 201994418 | U | 9/2011 |
| CN | 202042593 | U | 11/2011 |
| CN | 102544754 | B | 8/2015 |
| CN | 205122764 | U | 3/2016 |
| CN | 205159496 | U | 4/2016 |
| CN | 106602241 | A | 4/2017 |
| EP | 1770826 | A2 | 4/2007 |
| EP | 3154124 | A1 | 4/2017 |
| EP | 3154125 | A1 | 4/2017 |
| EP | 3154124 | B1 | 8/2018 |
| EP | 3444896 | A1 | 2/2019 |
| SU | 1665422 | A1 | 7/1991 |
| TW | M459541 | U | 8/2013 |
| TW | 201405936 | A | 2/2014 |
| TW | 201417399 | B | 5/2014 |
| TW | M517918 | U | 2/2016 |
| TW | M519333 | U | 3/2016 |
| TW | I553963 | B | 10/2016 |
| TW | I563735 | B | 12/2016 |
| TW | 201714353 | A | 4/2017 |
| WO | 1998019337 | A1 | 5/1998 |
| WO | 2004112189 | A1 | 12/2004 |
| WO | 2014058926 | A1 | 4/2014 |

* cited by examiner

TEN-FREQUENCY BAND ANTENNA

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

Field of the Invention

The present invention relates to an antenna, especially to a ten-frequency band antenna for enhancing the frequency response of the low-frequency segment and bandwidth of the high-frequency segment.

Description of Prior Art

The current commercially available planar inverted-F antenna (PIFA) is generally formed by printing metal material (such as copper) on printed circuit board (PCB) with two-dimensional printing technology. Alternatively, metal membrane is pressed into three-dimensional multi frequency band antenna.

The multi frequency bands signal transmission/reception can be achieved by changing the two-dimensional radiation patterns or the geometric shape of the three-dimensional radiation bodies. However, the antenna formed on PCB or formed by pressing metal membrane into radiation body need a specific volume to ensure signal transmission/reception quality and prevent signal tuning problem caused by environment. Moreover, the electronic device needs an internal space for arranging the PIFA structure, this causes impact on light weight and compact requirement of the electronic devices.

To overcome above problem, the radiation body of the antenna can be fabricated on a rectangular ceramic carrier. As shown in FIGS. 1 and 2, the carrier 101 of the antenna 10 has a high-frequency radiator 102 and a low-frequency radiator 103 on the surface thereof and the carrier 101 is fixed on the PCB 20. The PCB 20 has a ground metal plane 201, a signal feeding micro strip 202 and a ground wire 203 on two faces thereof, where the signal feeding micro strip 202 connects with the ground wire 203 and the radiator of the carrier 101. The high-frequency radiator 102 is arranged on the right side of the carrier 101 and the low-frequency radiator 103 is arranged on the left side of the carrier 101. The antenna 10 is electrically connected to the PCB 20 and the area of the ground metal plane 201 corresponding to the low-frequency radiator 103 is smaller than the area of the ground metal plane 201 corresponding to the high-frequency radiator 102. Therefore, the low-frequency radiator 103 suffers more to the ground shielding and the frequency response (see label A in FIG. 2) is not satisfactory. Moreover, the bandwidth of the high frequency radiator 102 is not wide enough (only covering 6 bands as shown by label B in FIG. 2). As a result, the signal transmission/reception quality is poor and signal transmission/reception bandwidth is limited.

SUMMARY OF THE INVENTION

It is an object of the present invention to change the position of the high-frequency segment and the low-frequency segment. The low-frequency segment is corresponding to a smaller area portion of the ground metal face on the PCB when the antenna carrier is fixed to the PCB. Therefore, the low-frequency segment is at a free space to enhance frequency response for the low-frequency segment and the bandwidth for the high-frequency segment.

It is another object of the present invention to provide blind holes and ribs in the carrier. The blind holes and the ribs can reduce the overall weight of the carrier 1 and prevent warp of the carrier. The area ratio of the blind holes and the volume ratio of the blind holes can be used to adjust the effective dielectric constant of the carrier, thus adjusting resonant frequency and the bandwidth.

It is still another object of the present invention to provide an inductor electrically connecting with the ground line and the micro strip to adjust impedance and provide ground for the antenna, thus forming a PIFA dipole antenna.

Accordingly the present invention provides a ten-frequency band antenna, comprising: a carrier being a ceramic rectangular body and comprising a front face, a top face, a back face and a bottom face, the carrier having a plurality of blind holes defined on the front face and concave into the carrier, and at least one rib between two adjacent blind holes; a high-frequency segment comprising an inverse-πshaped radiator, a straight shape radiator, a winding radiator and an L-shaped radiator, wherein the high-frequency segment is arranged on left portions of the front face, the top face, the back face and the bottom face of the carrier if viewing at the front face of the carrier; a low-frequency segment comprising a first rectangular radiator, a second rectangular radiator, a third rectangular radiator and a fourth rectangular radiator, wherein the low-frequency segment is arranged on right portions of the front face, the top face, the back face and the bottom face of the carrier if viewing at the front face of the carrier; a printed circuit board (PCB) having a top side, a left slanting side, a slanting bottom side, a right short side, a recessed side and a right long side, the PCB having a first face and a second face, the first face having a first ground metal face and a micro strip, the micro strip having a front section and a rear section, the front section having a through hole, the micro strip having a front portion extended into the first ground metal face such that a gap is defined between the micro strip and the first ground metal face, the first face of the PCB having an opened area with two fixing ends; an area portion of the first ground metal face, which is from the left slanting side to the gap being larger than an area portion of the first ground metal face, which is from the recessed side to the gap, a ground line extended on the smaller area portion of the first ground metal face extended from the recessed side to the gap, a separation defined between the ground line and the rear segment of the micro strip, the first face having an opened area with two fixed ends; an inductor arranged across the separation with one end electrically connecting with the rear section of the micro strip and another end electrically connecting with the ground line, wherein the two fixed ends of the opened area of the first face are fixed to the bottom face of the carrier such that the low-frequency segment is corresponding the recessed side and corresponding to the smaller area portion of the first ground metal face extended from the recessed side to the gap and the low-frequency segment is at a free space to enhance a frequency response of the low-frequency segment, the inverse-πshaped radiator, the straight shape radiator, and the winding radiator couple to each other to enhance a bandwidth of the high-frequency segment.

According to one aspect of the present invention, an area ratio of the blind holes on the front face and a volume ratio of the blind holes with respect to the carrier is adjustable to adjust an effective dielectric constant of the carrier, thus adjusting resonant frequency and the bandwidth.

According to another aspect of the present invention, the area ratio of the blind holes on the front face is 30%-50%.

According to still another aspect of the present invention, the area ratio of the blind holes on the front face is 40%.

According to still another aspect of the present invention, the volume ratio of the blind holes with respect to the carrier is 20%-30%.

According to still another aspect of the present invention, the volume ratio of the blind holes with respect to the carrier is 24%.

According to still another aspect of the present invention, the inverse-πshaped radiator has a first straightline portion, a second straightline portion and an L shaped portion, the first straightline portion is arranged on edges of the front face, the top face, the back face and the bottom face of the carrier, a portion of the first straightline portion on the bottom is used as fixed point for PCB.

According to still another aspect of the present invention, the straight shape radiator electrically connects to one side of the second straightline portion, the straight shape radiator is arranged on edges of the front face and the bottom face of the carrier, one end of the straight shape radiator is adjacent to the winding radiator for coupling and a portion of the straight shape radiator arranged on the bottom face is used as signal feeding point.

According to still another aspect of the present invention, one end of the winding radiator electrically connects with one end of the second straightline portion and another end of the winding radiator electrically connects with low-frequency segment such that a short side of the L-shaped radiator of the inverse-πshaped radiator is coupling to the winding radiator.

According to still another aspect of the present invention, pitches of the winding radiator are around 0.15 mm~0.3 mm to provide LC resonance with 2400 MHZ~2700 MHZ resonant frequency.

According to still another aspect of the present invention, the L-shaped radiator is arranged on the front face and bottom face of the carrier, the short side of the L-shaped radiator is parallel to the straight shape radiator, a long side of the of the L-shaped radiator is vertical to the straight shape radiator and parallel to the winding radiator, the long side of the of the L-shaped radiator provides ground point.

According to still another aspect of the present invention, the high-frequency segment provides a fourth frequency band, a fifth frequency band, a sixth frequency band, a seventh frequency band, an eighth frequency band, a ninth frequency band and a tenth frequency band, and the fourth frequency band, the fifth frequency band, the sixth frequency band, the seventh frequency band, the eighth frequency band, the ninth frequency band and the tenth frequency band are within 1710 MHZ~6000 MHZ.

According to still another aspect of the present invention, the high-frequency segment provides a first frequency band, a second frequency band, and a third frequency band, and the first frequency band, the second frequency band, and the third frequency band are within 700 MHZ~960 MHZ.

According to still another aspect of the present invention, the second face has a second ground metal face, the through hole is opened to the second ground metal face and electrically connects with a signal feeding end of a coaxial cable, the second ground metal face electrically connects with a ground end of the coaxial cable.

BRIEF DESCRIPTION OF DRAWING

The present disclosed example itself, however, may be best understood by reference to the following detailed description of the present disclosed example, which describes an exemplary embodiment of the present disclosed example, taken in conjunction with the accompanying drawings, in which.

DETAILED DESCRIPTION OF THE INVENTION

Figure 1:
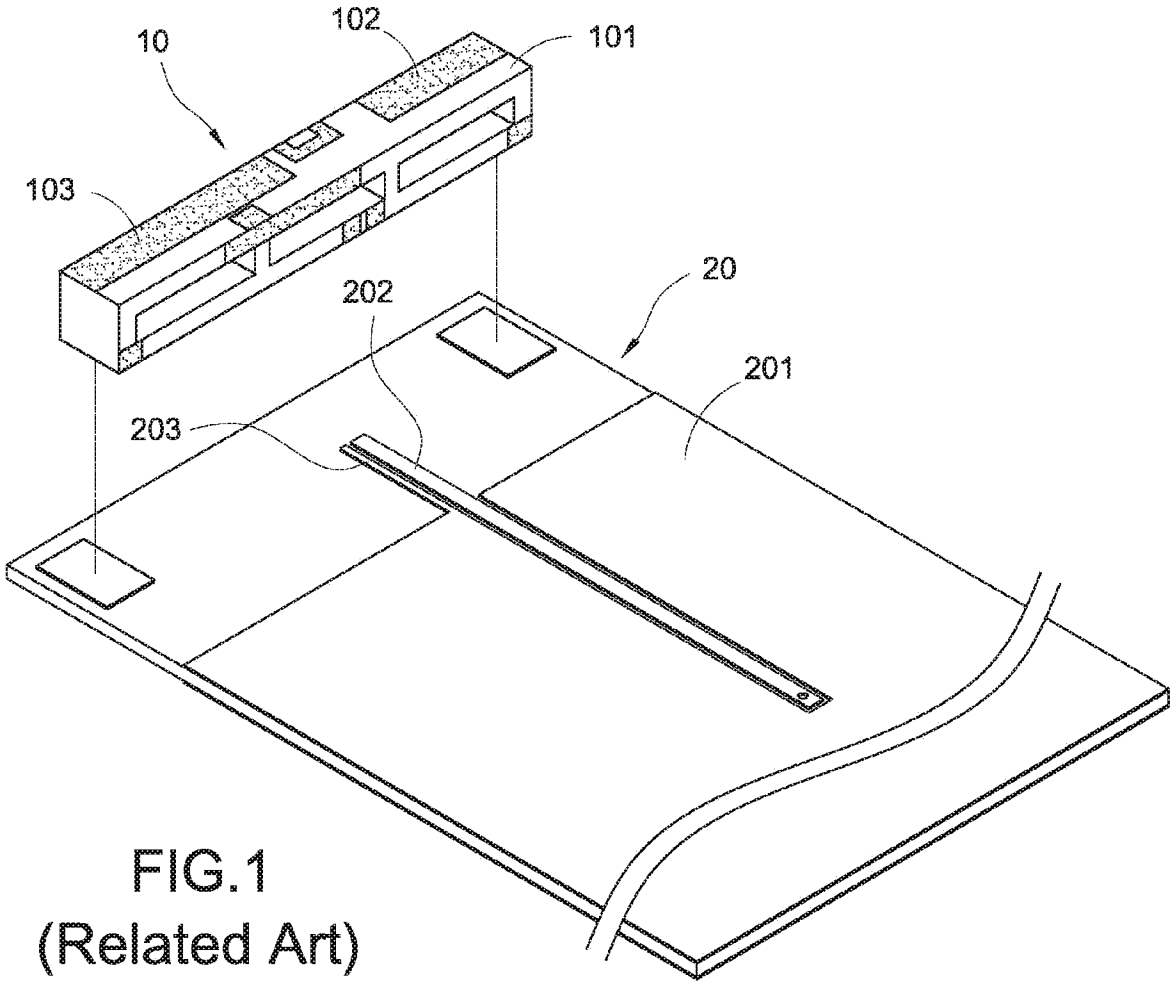
FIG.1 (Related Art)
FIG. 1 shows a conventional multi-band antenna.
Figure 2:
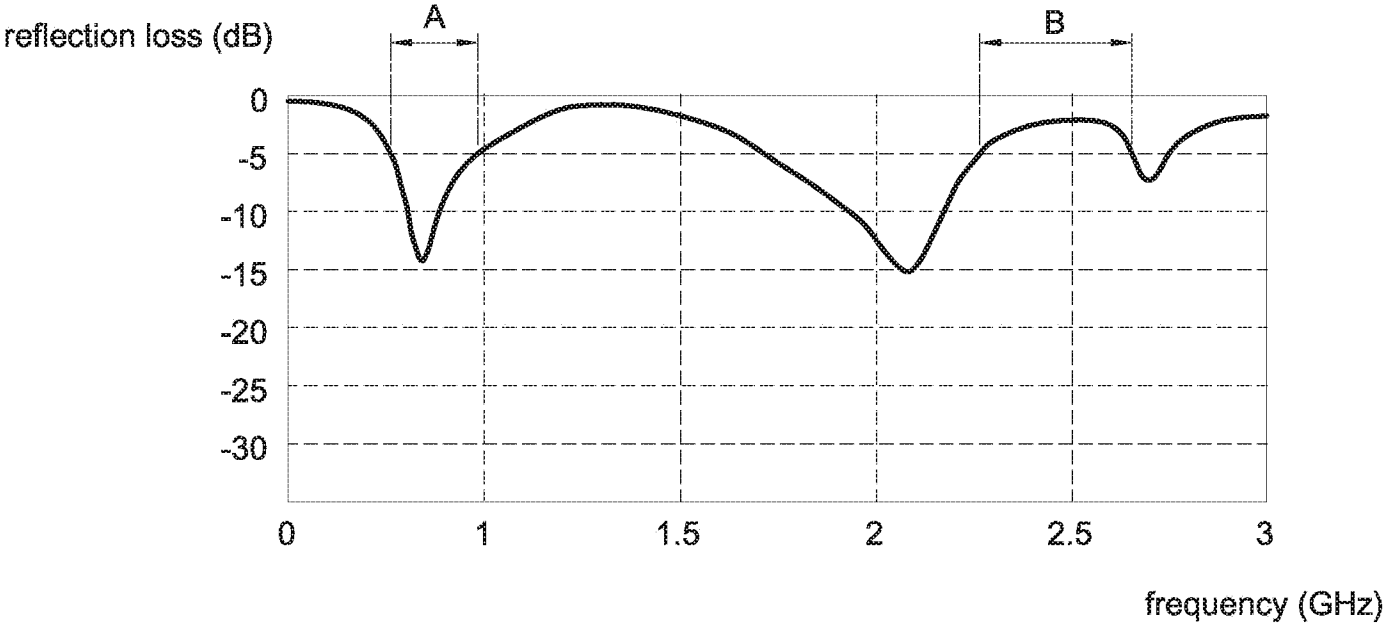
FIG.2 (Related Art)
FIG. 2 shows the reflection coeffictions of the multi-band antenna in FIG. 1.
Figure 4:
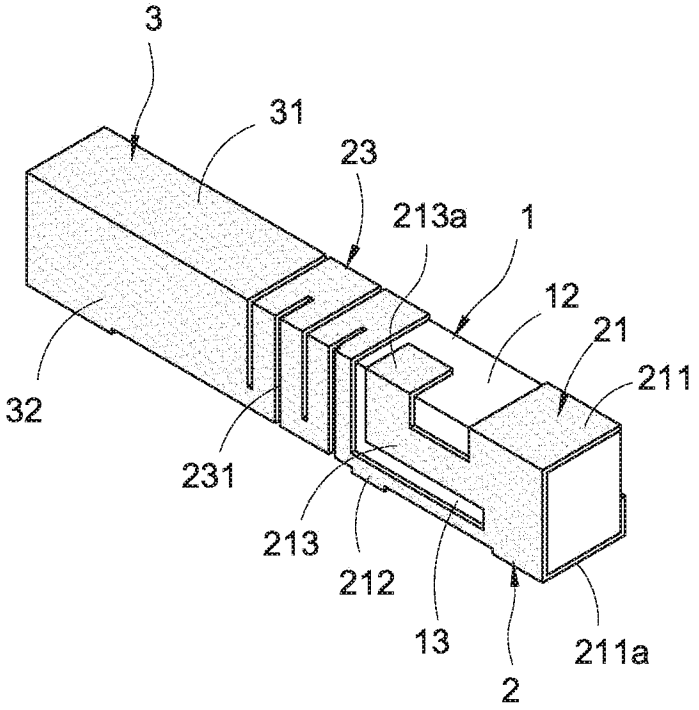
FIG. 4 shows the top perspective view of the carrier of the ten-frequency band antenna according to the present invention.
Figure 3:
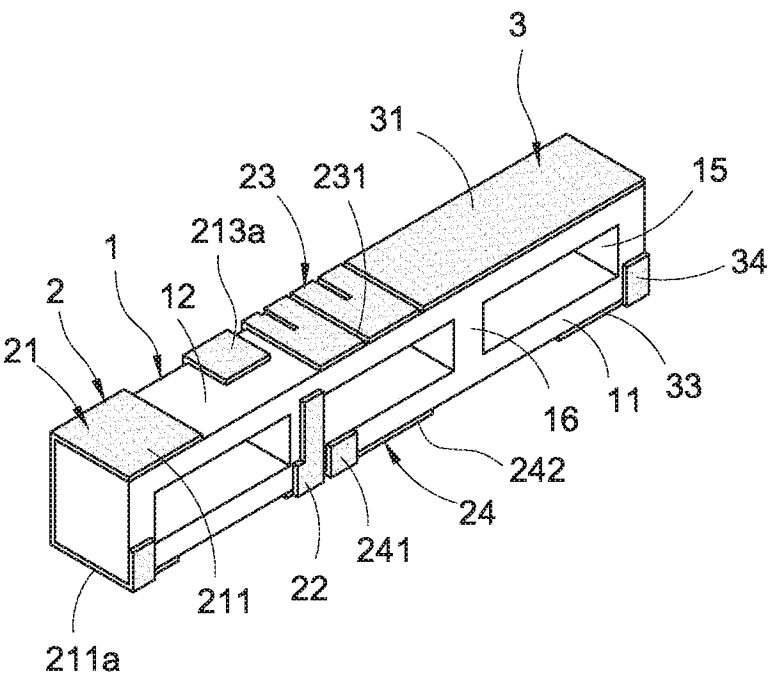
FIG. 3 shows the front perspective view of the carrier of the ten-frequency band antenna according to the present invention.
Figure 6:
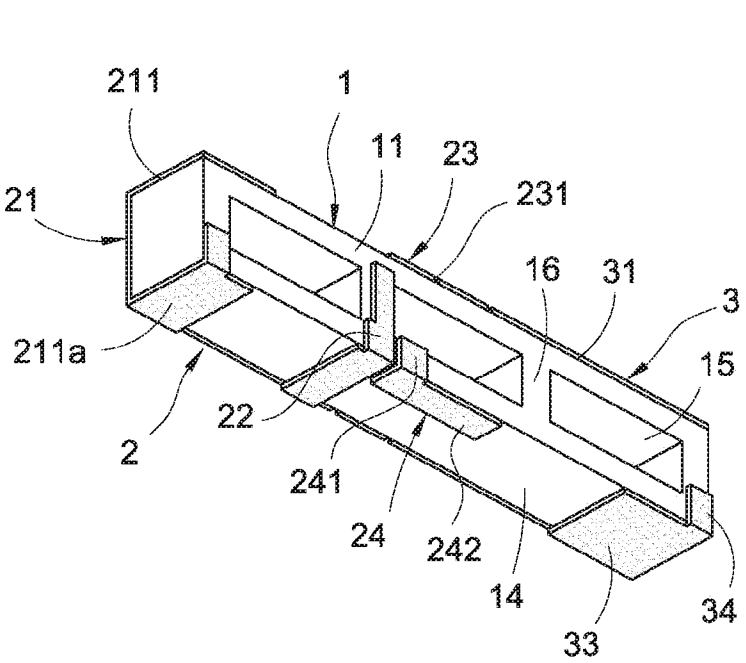
FIG. 6 shows the back perspective view of the carrier of the ten-frequency band antenna according to the present invention.
Figure 5:
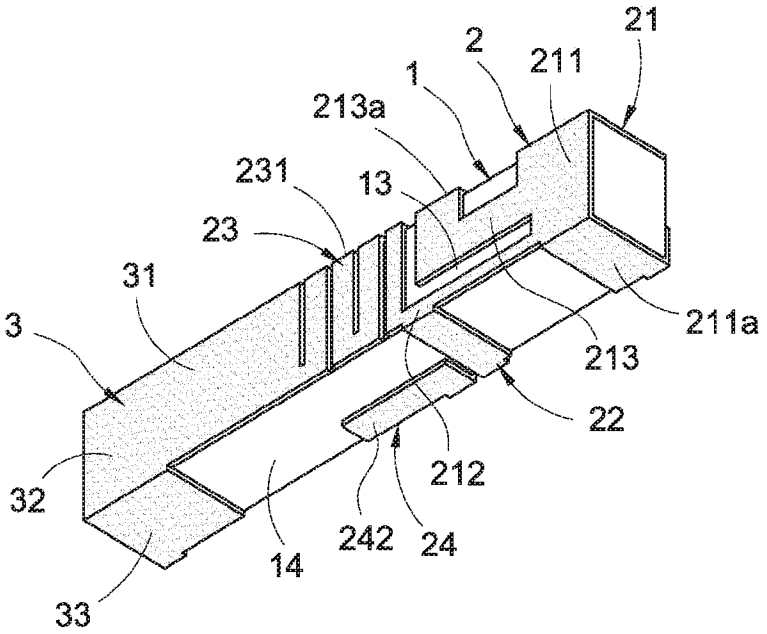
FIG. 5 shows the back perspective view of the carrier of the ten-frequency band antenna according to the present invention.
Figure 7:
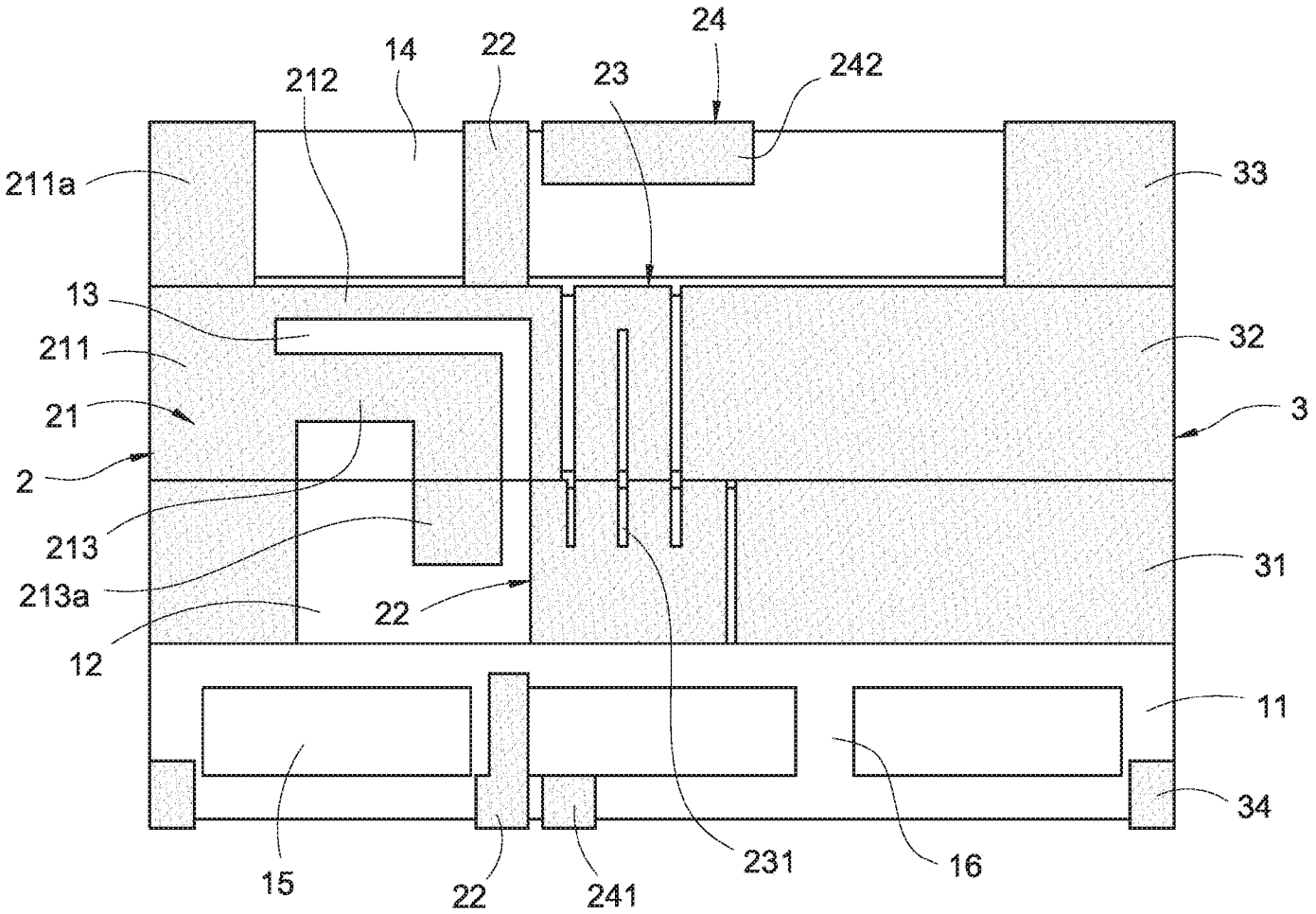
FIG. 7 shows expanded view of the metal radiators of the carrier of the ten-frequency band antenna according to the present invention.

FIG. 3 shows the front perspective view of the carrier of the ten-frequency band antenna according to the present invention; FIG. 4 shows the top perspective view of the carrier of the ten-frequency band antenna according to the present invention; FIG. 5 shows the back perspective view of the carrier of the ten-frequency band antenna according to the present invention; FIG. 6 shows the back perspective view of the carrier of the ten-frequency band antenna according to the present invention; and FIG. 7 shows expanded view of the metal radiators of the carrier of the ten-frequency band antenna according to the present invention. The ten-frequency band antenna according to the present invention comprises a carrier 1, a high-frequency segment 2, and a low-frequency segment 3.

The carrier 1 is a ceramic rectangular body with a front face 11, a top face 12, a back face 13 and a bottom face 14. The front face 11 has a plurality of blind holes 15 defined thereon and each two blind holes have a rib 16 therebetween. The blind holes 15 and the ribs 16 can reduce the overall weight of the carrier 1 and prevent warp of the carrier 1. The area ratio of the blind holes 15 on the front face 11 and the volume ratio of the blind holes 15 with respect to the carrier 1 can be used to adjust the effective dielectric constant of the carrier 1, thus adjusting resonant frequency and the bandwidth. The area ratio of the blind holes 15 on the front face 11 is around 30%-50%, and more particularly can be 40%. The volume ratio of the blind holes 15 with respect to the carrier 1 is 20%-30% and more particularly can be 24%. Moreover, the shape and the symmetric degree of the blind holes 15 can also be adjusted.

When viewing from the frond face 11 of the carrier 1, the high-frequency segment 2 is arranged on the left side of the carrier 1 and has an inverse-πshaped radiator 21, a straight shape radiator 22, a winding radiator 23 and an L-shaped radiator 24. The inverse-πshaped radiator 21 has a first straightline portion 211, a second straightline portion 212 and an L shaped portion 213.

The first straightline portion 211 is arranged on edges of the front face 11, the top face 12, the back face 13 and the bottom face 14. The portion of the first straightline portion 211 on the bottom face 14, namely the bottom first straightline portion 211a is used as fixed point for PCB (not shown). The second straightline portion 212 of the inverse-πshaped radiator 21 connects with the straight shape radiator 22 at one edge thereof. The straight shape radiators 22 are arranged on the front face 11 and the bottom face 14, respectively. One end of the straight shape radiator 22 is adjacent to the winding radiator 23 such that the coupling therebetween provides 4900 MHZ~6000 MHZ bandwidth. The straight shape radiator 22 arranged on the bottom face 14 is used as signal feeding point. One end of the winding radiator 23 electrically connects with one end of the second straightline portion 212 and another end of the winding radiator 23 electrically connects with low-frequency segment 3. The short side 213a of the L shaped portion 213 and the winding radiator 23 have coupling therebetween to provide 3500 MHZ bandwidth. The pitches of the winding radiator 23 are around 0.15 min~0.3 mm to provide LC resonance with 2400 MHZ~2700 MHZ resonant frequency. The L-shaped radiator 24 is arranged on the front face 11 and the bottom face 14. The short side 241 of the L-shaped radiator 24 is parallel to the straight shape radiator 22, the long side 242 of the L-shaped radiator 24 is vertical to the straight shape radiator 22 and parallel to the winding radiator 23. In the shown embodiment, the longer side 242 of the L-shaped radiator 24 is used as ground end. In the shown embodiment, high-frequency segment 2 provides the fourth frequency band, the fifth frequency band, the sixth frequency band, the seventh frequency band, the eighth frequency band, the ninth frequency band and the tenth frequency band. The frequency range of the fourth frequency band, the fifth frequency band, the sixth frequency band, the seventh frequency band, the eighth frequency band, the ninth frequency band and the tenth frequency band is between 1710 MHZ and 6000 MHZ, and can be used in GSM, WCDMA, WIFI, LTE, WIMAX and 802.11ac communication system.

When viewing from the front face 11 of the carrier 1, the low-frequency segment 3 is arranged on the right side of the carrier 1 and has a first rectangular radiation body 31, a second rectangular radiation body 32, a third rectangular radiation body 33 and a fourth rectangular radiation body 34, where each of the rectangular radiation bodies has different area and is respectively arranged on the front face 11, the top face 12, the back face 13 and the bottom face 14 of the carrier 1. The third rectangular radiation body 33 provides fixing points with the printed circuit board. In the shown embodiment, the low-frequency segment 3 provides the first frequency band, the second frequency band, and the third frequency band. The frequency range of the first frequency band, the second frequency band, and the third frequency band is between 700 MHZ and 960 MHZ, and can be used in LTE and GMS communication system.

Figure 8:
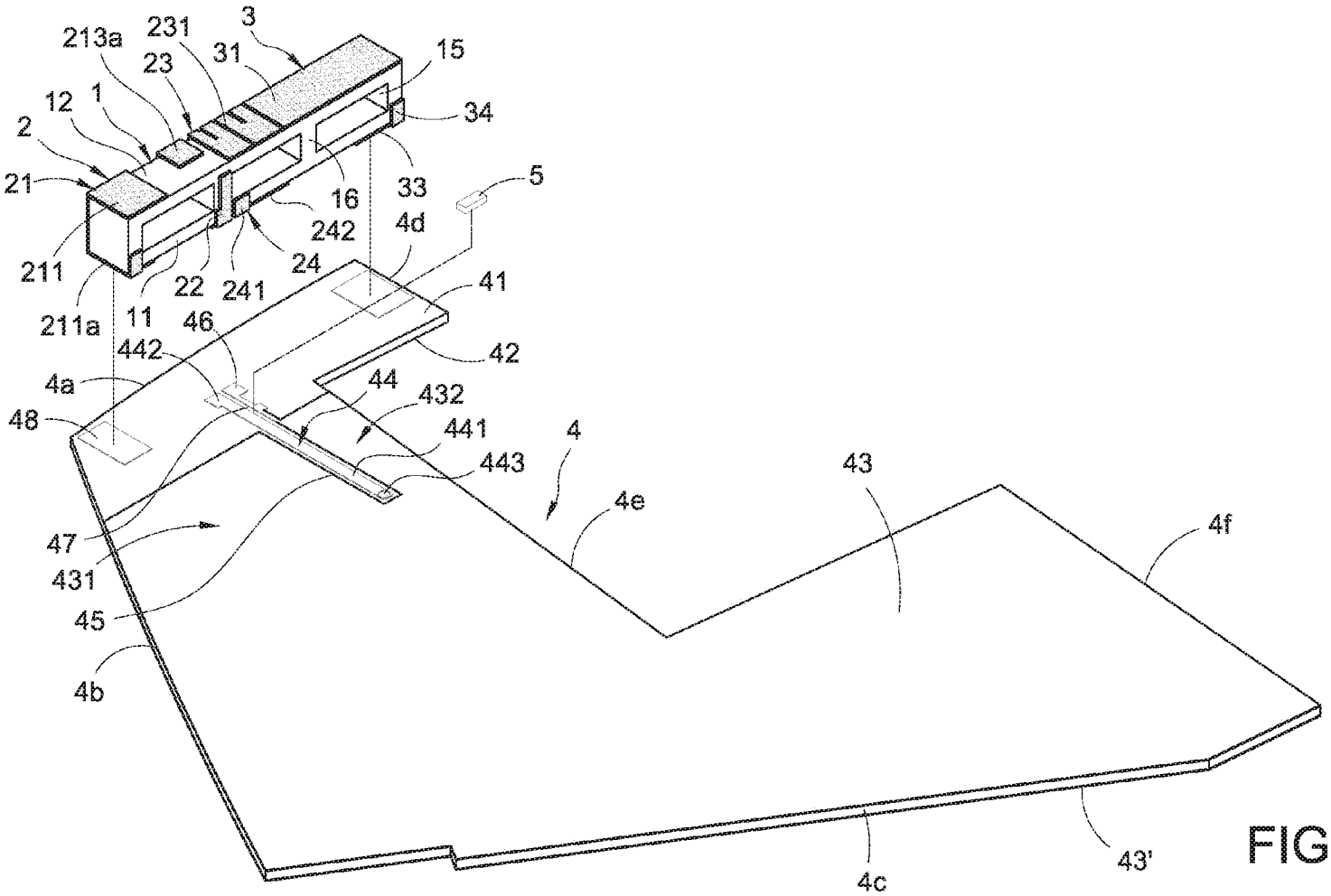
FIG. 8 shows the exploded view of the ten-frequency band antenna and the PCB.
Figure 9:
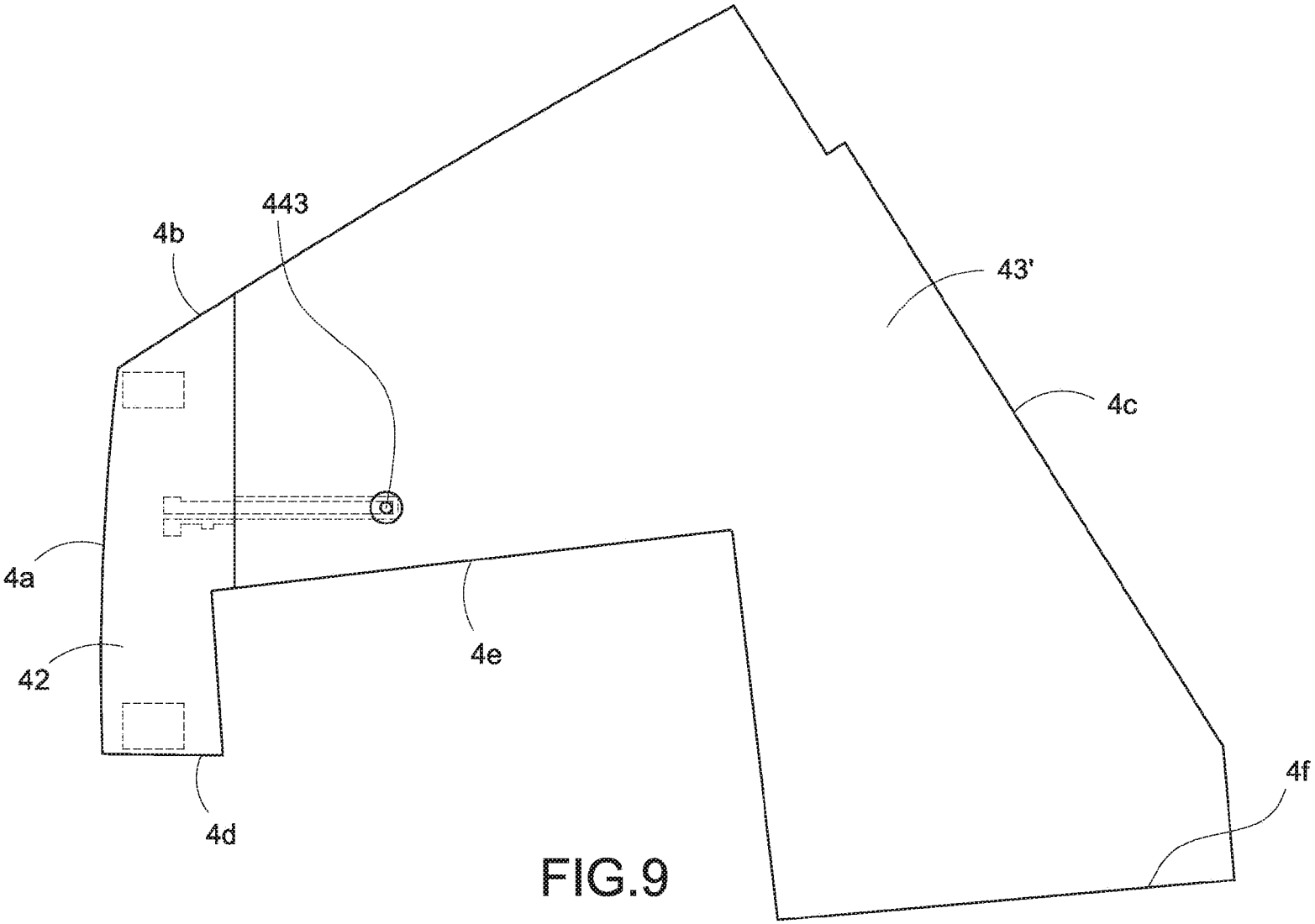
FIG. 9 shows the backside view of the ten-frequency band antenna and the PCB.
Figure 10:
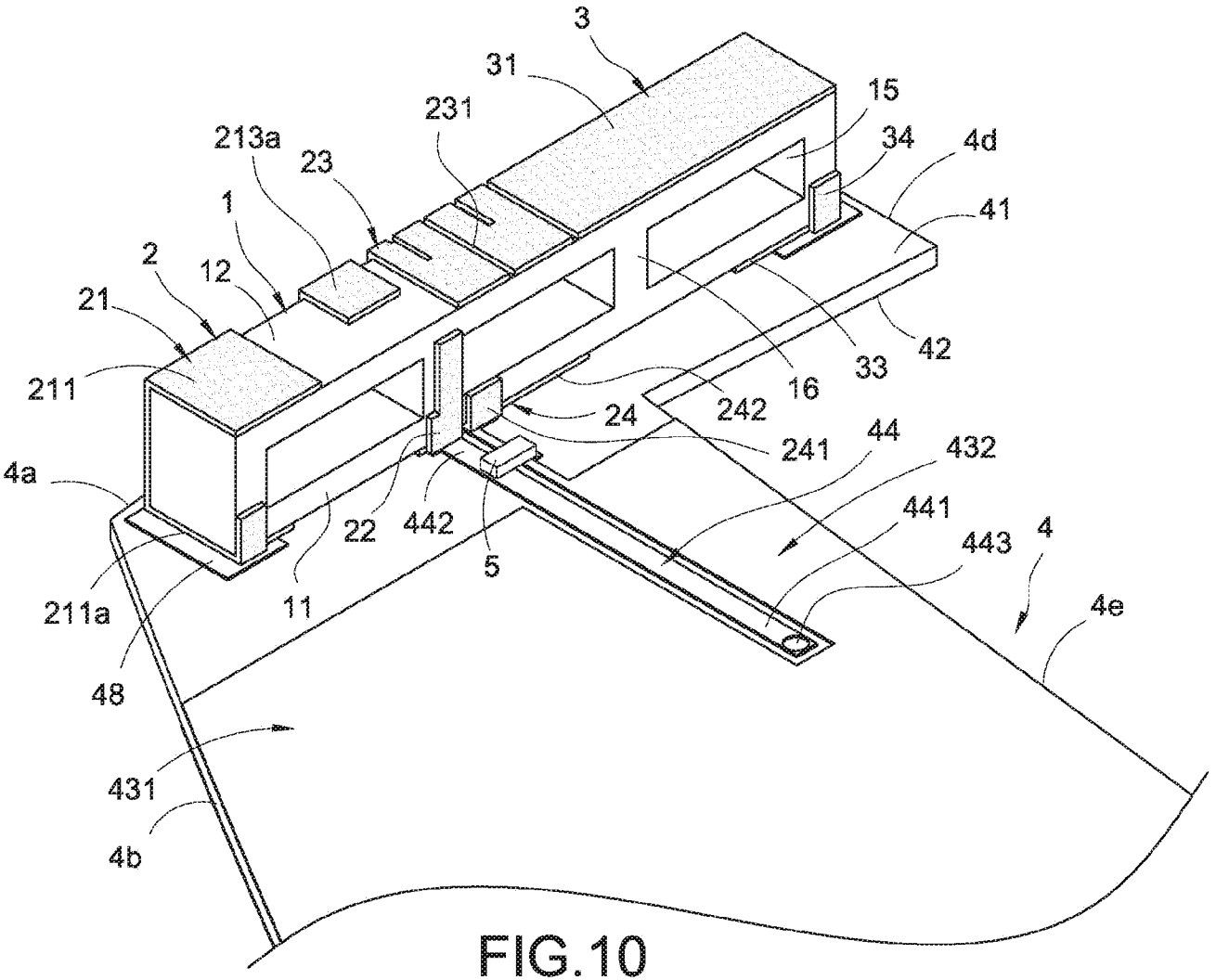
FIG. 10 shows the electric connection of the ten-frequency band antenna and the PCB.

FIGS. 8 to 10 show the exploded view, the backside view and the electric connection of the ten-frequency band antenna and the PCB. The ten-frequency band antenna further comprises a PCB 4 fixed to the carrier 1 and the PCB has a top side 4a, a left slanting side 4b, a bottom slanting side 4c, a right short side 4d, a recessed side 4e and a right long side 4f. Moreover, the PCB 4 has a first face 41 and a second face 42. The first face 41 has a first ground metal face 43 and a micro strip 44. The micro strip 44 has a front section 441 and a rear section 442. The front section 441 has a through hole 443 and extends into the first ground metal face 43 such that a gap 45 is defined between the front section 441 and the first ground metal face 43. Moreover, the area portion 431 of the first ground metal face 43, which is from the left slanting side 4b to the gap 45, is larger than the area portion 432 of the first ground metal face 43, which is from the recessed side 4e to the gap 45.

Moreover, a ground line 46 is extended on the area portion 432 of the first ground metal face 43, which is from the recessed side 4e to the gap 45. The ground line 46 is parallel to the rear section 442 of the micro strip 44. A separation 47 is defined between the ground line 46 and the rear section 442 of the micro strip 44. An inductor 5 is connected between the ground line 46 and the rear section 442 of the micro strip 44 and cross the separation 47 to adjust impedance and provide ground for the antenna, thus forming a PIFA dipole antenna. The opened area of the first face 41 has two corresponding fixed ends 48 for fixed connection with the first straightline portion 211a and the third rectangular radiation body 33.

The second face 42 further as a second ground metal face 43', where the through hole 443 is opened to the second ground metal face 43' and electrically connects with a signal feeding end (not shown) of a coaxial cable. The second ground metal face 43' electrically connects with the ground end of the coaxial cable.

When the carrier 1 is fixed to the PCB 4, the two fixed ends 48 are fixed to the first straightline portion 211a and the third rectangular radiation body 33 respectively. The straight shape radiator 22 on the bottom face 14 electrically connects the micro strip 44. The long side 242 of the L-shaped radiator 24 electrically connects with the ground line 46. After fixing the carrier 1, the low-frequency segment 3 is arranged on the opened area and corresponding to the recessed side 4e of the PCB 4 and corresponding to the smaller area portion 432 of the first ground metal face 43 such that the low-frequency segment 3 is located at a free space to enhance the frequency response of the low-frequency segment 3.

Figure 11:
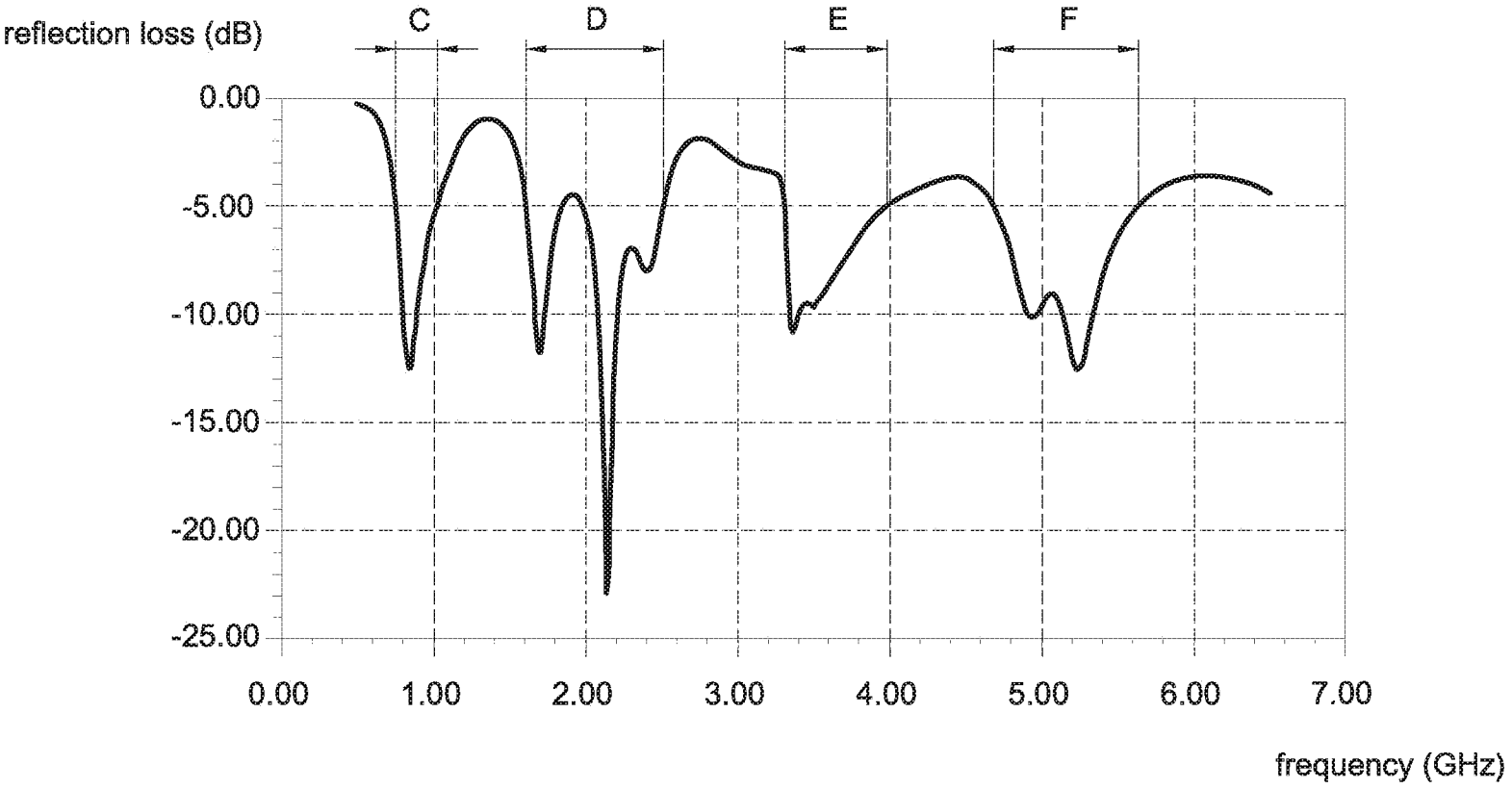
FIG. 11 shows the reflection loss curve of the ten-frequency band antenna of the present invention.

FIG. 11 shows the reflection loss curve of the ten-frequency band antenna of the present invention. With reference also to FIG. 10, after fixing the carrier 1 to the PCB 4, the low-frequency segment 3 is arranged on the opened area and corresponding to the recessed side 4e of the PCB 4 and the smaller area portion 432 of the first ground metal face 43 such that the low-frequency segment 3 is at a free space with less shielding. The ten-frequency band antenna of the present invention has better frequency response for the low-frequency segment 3 and higher bandwidth for the high-frequency segment 2. Moreover, the low-frequency segment 3 provides the first frequency band, the second frequency band, and the third frequency band. The frequency range of the first frequency band, the second frequency band, and the third frequency band is between 700 MHZ and 960 MHZ, as indicated by mark C in FIG. 11. The high-frequency segment 2 provides the fourth frequency band, the fifth frequency band, and the sixth frequency band with frequency range between 1710 MHZ and 2710 MHZ, as indicated by mark D in FIG. 11. The high-frequency segment 2 provides the seventh frequency band with frequency range 2400 MHZ~2500 MHZ and the eighth frequency band with frequency range 2600 MHZ~2700 MHZ, as indicated by mark D in FIG. 11. The high-frequency segment 2 provides the ninth frequency band with frequency range 3500 MHZ~3700 MHZ, as indicated by mark E in FIG. 11. The high-frequency segment 2 provides the tenth frequency band with frequency range 4900 MHZ~6000 MHZ, as indicated by mark F in FIG. 11.

The foregoing descriptions of embodiments of the disclosed example have been presented only for purposes of illustration and description. They are not intended to be exhaustive or to limit the disclosed example to the forms disclosed. Accordingly, many modifications and variations will be apparent to practitioners skilled in the art. Additionally, the above disclosure is not intended to limit the disclosed example. The scope of the disclosed example is defined by the appended.

What is claimed is:

1. A ten-frequency band antenna, comprising:

a carrier being a ceramic rectangular body and comprising a front face, a top face, a back face and a bottom face, the carrier having a plurality of blind holes defined on the front face and concave into the carrier, and at least one rib between two adjacent blind holes;

a high-frequency segment comprising an inverse-πshaped radiator, a straight shape radiator, a winding radiator and an L-shaped radiator, wherein the high-frequency segment is arranged on left portions of the front face, the top face, the back face and the bottom face of the carrier if viewing from the front face of the carrier;

a low-frequency segment comprising a first rectangular radiator, a second rectangular radiator, a third rectangular radiator and a fourth rectangular radiator, wherein the low-frequency segment is arranged on right portions of the front face, the top face, the back face and the bottom face of the carrier if viewing from the front face of the carrier;

a printed circuit board (PCB) having a top side, a left slanting side, a slanting bottom side, a right short side, a recessed side and a right long side, the PCB having a first face and a second face, the first face having a first ground metal face and a micro strip, the micro strip having a front section and a rear section, the front section having a through hole, the micro strip having a front section extended into the first ground metal face such that a gap is defined between the micro strip and the first ground metal face, the first face of the PCB having an opened area with two fixing ends; an area portion of the first ground metal face, which is from the left slanting side to the gap being larger than an area portion of the first ground metal face, which is from the recessed side to the gap, a ground line extended on the smaller area portion of the first ground metal face extended from the recessed side to the gap, a separation defined between the ground line and the rear section of the micro strip, the first face having an opened area with two fixed ends;

an inductor arranged across the separation with one end electrically connecting with the rear section of the micro strip and another end electrically connecting with the ground line, wherein the two fixed ends of the opened area of the first face are fixed to the bottom face of the carrier such that the low-frequency segment is corresponding the recessed side and corresponding to the smaller area portion of the first ground metal face extended from the recessed side to the gap and the low-frequency segment is at a free space to enhance a frequency response of the low-frequency segment, the inverse-πshaped radiator, the straight shape radiator, and the winding radiator couple to each other to enhance a bandwidth of the high-frequency segment.

2. The ten-frequency band antenna in claim 1, wherein an area ratio of the blind holes on the front face and a volume ratio of the blind holes with respect to the carrier is adjustable to adjust an effective dielectric constant of the carrier, thus adjusting resonant frequency and the bandwidth.

3. The ten-frequency band antenna in claim 2, wherein the area ratio of the blind holes on the front face is 30%-50%.

4. The ten-frequency band antenna in claim 3, wherein the area ratio of the blind holes on the front face is 40%.

5. The ten-frequency band antenna in claim 2, wherein the volume ratio of the blind holes with respect to the carrier is 20%-30%.

6. The ten-frequency band antenna in claim 5, wherein the volume ratio of the blind holes with respect to the carrier is 24%.

7. The ten-frequency band antenna in claim 1, wherein the inverse-πshaped radiator has a first straightline portion, a second straightline portion and an L shaped portion, the first straightline portion is arranged on edges of the front face, the top face, the back face and the bottom face of the carrier, a portion of the first straightline portion on the bottom is used as fixed point for PCB.

8. The ten-frequency band antenna in claim 7, wherein the straight shape radiator electrically connects to one side of the second straightline portion, the straight shape radiator is arranged on edges of the front face and the bottom face of the carrier, one end of the straight shape radiator is adjacent to the winding radiator for coupling and a portion of the straight shape radiator arranged on the bottom face is used as signal feeding point.

9. The ten-frequency band antenna in claim 8, wherein one end of the winding radiator electrically connects with one end of the second straightline portion and another end of the winding radiator electrically connects with low-frequency segment such that a short side of the L-shaped radiator of the inverse-πshaped radiator is coupling to the winding radiator.

10. The ten-frequency band antenna in claim 8, wherein pitches of the winding radiator are around 0.15 mm~0.3 mm to provide LC resonance with 2400 MHZ~2700 MHZ resonant frequency.

11. The ten-frequency band antenna in claim 10, wherein the L-shaped radiator is arranged on the front face and bottom face of the carrier, the short side of the L-shaped radiator is parallel to the straight shape radiator, a long side of the of the L-shaped radiator is vertical to the straight shape radiator and parallel to the winding radiator, the long side of the L-shaped radiator provides ground point.

12. The ten-frequency band antenna in claim 11, wherein the high-frequency segment provides a fourth frequency band, a fifth frequency band, a sixth frequency band, a seventh frequency band, an eighth frequency band, a ninth frequency band and a tenth frequency band, and the fourth frequency band, the fifth frequency band, the sixth frequency band, the seventh frequency band, the eighth frequency band, the ninth frequency band and the tenth frequency band are within 1710 MHZ~6000 MHZ.

13. The ten-frequency band antenna in claim 1, wherein the low-frequency segment provides a first frequency band, a second frequency band, and a third frequency band, and the first frequency band, the second frequency band, and the third frequency band are within 700 MHZ~960 MHZ.

14. The ten-frequency band antenna in claim 1, wherein the second face has a second ground metal face, the through hole is opened to the second ground metal face and electrically connects with a signal feeding end of a coaxial cable, the second ground metal face electrically connects with a ground end of the coaxial cable.

* * * * *